(12) United States Patent
Holaday et al.

(10) Patent No.: US 12,655,915 B2
(45) Date of Patent: Jun. 16, 2026

(54) PRESSURE BALANCED VALVE WITH INTEGRAL PRESSURE RELIEF FUNCTION

(71) Applicant: Fox Factory, Inc., Duluth, GA (US)

(72) Inventors: Thomas Holaday, Arden, NC (US); Season Chu, Tai-Chung (TW); William O. Brown, IV, Hendersonville, NC (US); Joshua Coaplen, Asheville, NC (US)

(73) Assignee: Fox Factory, Inc., Duluth, GA (US)

( * ) Notice: Subject to any disclaimer, the term of this patent is extended or adjusted under 35 U.S.C. 154(b) by 177 days.

(21) Appl. No.: 18/367,361

(22) Filed: Sep. 12, 2023

(65) Prior Publication Data

US 2025/0084928 A1     Mar. 13, 2025

(51) Int. Cl.
| | |
|---|---|
| *F16K 7/04* | (2006.01) |
| *F16K 17/04* | (2006.01) |
| *F16K 17/08* | (2006.01) |
| *F16K 17/10* | (2006.01) |

(52) U.S. Cl.
CPC ........ *F16K 17/0466* (2013.01); *F16K 17/082* (2013.01); *F16F 2230/06* (2013.01); *F16F 2232/08* (2013.01); *F16F 2236/04* (2013.01); *F16F 2238/04* (2013.01); *F16K 17/10* (2013.01)

(58) Field of Classification Search
CPC .... F16K 17/10; F16K 17/0466; F16K 17/082; F16F 2230/06; F16F 2232/08; F16F 2236/04; F16F 2238/04
USPC ................ 188/322.13, 322.15; 280/275, 276
See application file for complete search history.

(56) References Cited

U.S. PATENT DOCUMENTS

| | | | |
|---|---|---|---|
| 5,116,028 A | 5/1992 | Wirges et al. | |
| 6,217,049 B1 | 4/2001 | Becker | |
| 6,296,092 B1 | 10/2001 | Marking et al. | |
| 6,382,370 B1 | 5/2002 | Girvin | |
| 8,191,964 B2 | 6/2012 | Hsu et al. | |
| 8,398,104 B2 | 3/2013 | Hsu | |
| 8,894,025 B2 | 11/2014 | Wehage et al. | |
| 9,422,018 B2 | 8/2016 | Pelot et al. | |
| 9,963,181 B2 * | 5/2018 | Madau | F16F 9/5126 |

(Continued)

FOREIGN PATENT DOCUMENTS

| | | |
|---|---|---|
| CN | 201925395 U | 8/2011 |
| CN | 111188867 A | 5/2020 |

(Continued)

OTHER PUBLICATIONS

United Kingdom Search Report for UK Application No. GB2413463. 7, 1 page, Mailed Mar. 12, 2025.

(Continued)

*Primary Examiner* — Christopher P Schwartz

(57) ABSTRACT

A pressure balanced valve with integral pressure relief function is disclosed. The pressure relief valve includes a cap with an opening therein, a plunger configured to fill the opening in the cap, and a spring configured to hold the plunger against the cap. The pressure relief valve providing a fluid pathway through a piston, wherein the fluid pathway extends between a first fluid chamber and a second fluid chamber and provides a bypass for fluid to flow from the second fluid chamber to the first fluid chamber when a pressure of a fluid in the second fluid chamber is above a blow-off pressure of the pressure relief valve.

14 Claims, 11 Drawing Sheets

700

(56)　　　　　References Cited

U.S. PATENT DOCUMENTS

| | | | | |
|---|---|---|---|---|
| 10,221,914 | B2* | 3/2019 | Yablon | F16F 9/065 |
| 10,427,741 | B2 | 10/2019 | Madau et al. | |
| 10,427,742 | B2 | 10/2019 | Osada et al. | |
| 10,576,803 | B2 | 3/2020 | Marking et al. | |
| 11,091,215 | B2 | 8/2021 | Madau et al. | |
| 11,884,122 | B2 | 1/2024 | Strickland et al. | |
| 2006/0065496 | A1 | 3/2006 | Fox | |
| 2011/0057485 | A1 | 3/2011 | Shirai | |
| 2012/0104727 | A1 | 5/2012 | Hsu | |
| 2012/0181126 | A1 | 7/2012 | De Kock | |
| 2012/0228906 | A1 | 9/2012 | Mcandrews et al. | |
| 2012/0234639 | A1 | 9/2012 | Teraoka et al. | |
| 2012/0247894 | A1 | 10/2012 | Shirai | |
| 2013/0093231 | A1 | 4/2013 | Hsu | |
| 2013/0221713 | A1 | 8/2013 | Pelot et al. | |
| 2013/0313056 | A1 | 11/2013 | Cox et al. | |
| 2015/0034779 | A1 | 2/2015 | Mcandrews et al. | |
| 2015/0191208 | A1 | 7/2015 | Hsu | |
| 2015/0217829 | A1 | 8/2015 | Ericksen et al. | |
| 2015/0225030 | A1 | 8/2015 | Shirai | |
| 2015/0232142 | A1 | 8/2015 | Shirai | |
| 2018/0186419 | A1 | 7/2018 | Shipman et al. | |
| 2018/0222541 | A1 | 8/2018 | Madau et al. | |
| 2019/0154100 | A1 | 5/2019 | Coaplen et al. | |
| 2020/0231245 | A1 | 7/2020 | Lynch | |
| 2025/0084876 | A1* | 3/2025 | Coaplen | F15B 15/1452 |
| 2025/0376994 | A1* | 12/2025 | Coaplen | F15B 15/1452 |

FOREIGN PATENT DOCUMENTS

| | | | |
|---|---|---|---|
| CN | 114738426 | A | 7/2022 |
| CN | 114738429 | A | 7/2022 |
| CN | 114738431 | A | 7/2022 |
| DE | 69833372 | T2 | 4/2006 |
| DE | 102005040283 | A1 | 3/2007 |
| DE | 102009022361 | A1 | 12/2009 |
| DE | 102011101634 | A1 | 5/2012 |
| DE | 102011109528 | A1 | 10/2012 |
| DE | 102015101368 | A1 | 8/2015 |
| DE | 102016010845 | A1 | 4/2017 |
| DE | 102018005179 | A1 | 1/2019 |
| DE | 102020133551 | A1 | 6/2021 |
| DE | 102024126256 | A1 | 3/2025 |
| DE | 102024126267 | A1 | 3/2025 |
| EP | 2594467 | A1 | 5/2013 |
| GB | 2635942 | A | 6/2025 |
| GB | 2636614 | A | 6/2025 |
| JP | 2022180852 | A | 12/2022 |
| WO | 2021094611 | A1 | 5/2021 |

OTHER PUBLICATIONS

United Kingdom Search Report for UK Application No. GB2413464.5, 2 pages, Mailed Feb. 24, 2025.

EP Search Report for European Application No. 16194674.4, Feb. 24, 2017, 9 Pages.

Germany Search Report for DE Application No. DE10 2024 126 256.7, 12 pages, Mailed May 13, 2025.

Germany Search Report for DE Application No. DE10 2024 126 267.2, 14 pages, Mailed May 14, 2025.

* cited by examiner

700

800

PRESSURE BALANCED VALVE WITH INTEGRAL PRESSURE RELIEF FUNCTION

FIELD OF THE INVENTION

Embodiments of the invention generally relate to telescopic assemblies.

BACKGROUND

In many telescopic assemblies, the available axial length for the components of the telescopic assembly, and specifically those operating within the chamber, is large enough that the size (e.g., axial length) and/or displacement of the components of the telescopic assembly do not deleteriously affect the operation of the telescopic assembly.

However, in a telescopic assembly with a smaller and/or size restricted chamber axial length and/or volume, such as a dropper seatpost, a fork, or a shock, for example, the difference of one or a few millimeters of axial length of a component and/or system within the telescopic assembly will significantly impact the size, weight, and/or operational range (e.g., stroke) of the telescopic assembly. For example, in a dropper seatpost, a fork, or a shock removing one or a few millimeters of axial length from one or more telescopic assembly components and/or removing some volume from a component can directly translate to an increased operational range and/or a reduction in overall length of the telescopic assembly. Moreover, such modifications often result in a weight loss. As with many high performance vehicles, even the smallest weight reduction is a valued commodity.

BRIEF DESCRIPTION OF THE DRAWINGS

Aspects of the present invention are illustrated by way of example, and not by way of limitation, in the accompanying drawings, wherein.

DESCRIPTION OF EMBODIMENTS

Figure 1:
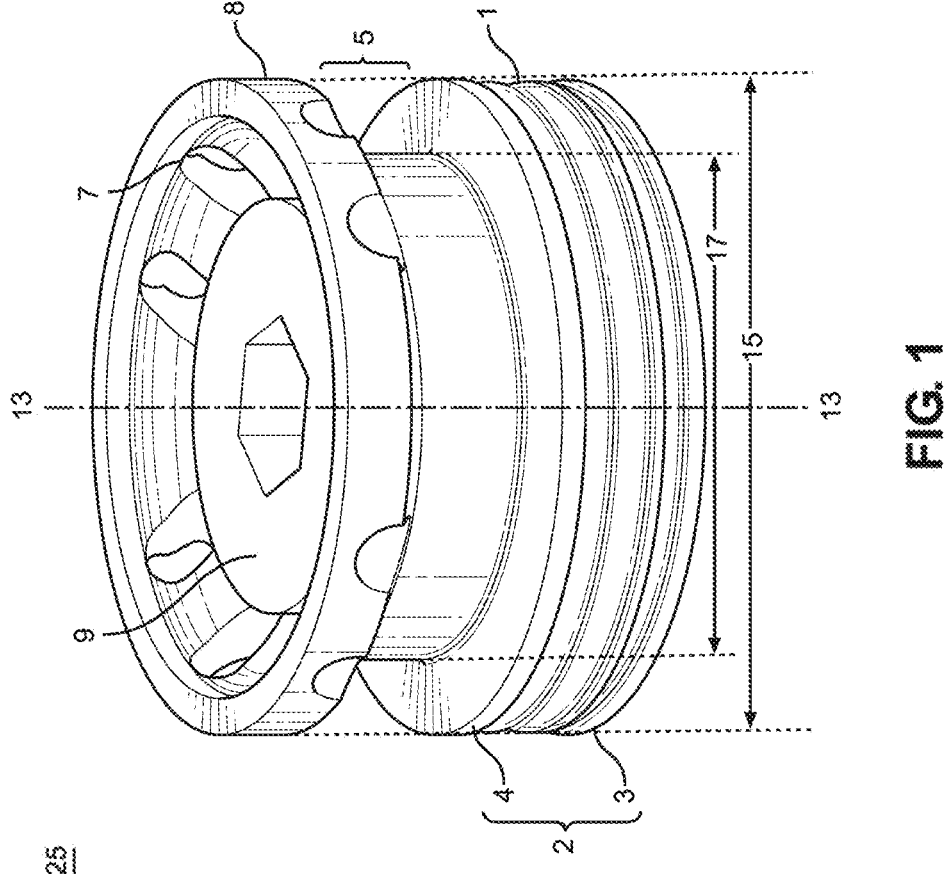
FIG. 1 is a perspective view of an IFP with an anti-tipping feature, shown in accordance with an embodiment.

The detailed description set forth below in connection with the appended drawings is intended as a description of various embodiments of the present invention and is not intended to represent the only embodiments in which the present invention is to be practiced. Each embodiment described in this disclosure is provided merely as an example or illustration of the present invention, and should not necessarily be construed as preferred or advantageous over other embodiments. In some instances, well known methods, procedures, and objects have not been described in detail as not to unnecessarily obscure aspects of the present disclosure.

In general, a suspension system for a vehicle provides a motion modifiable connection between a portion of the vehicle that is in contact with a surface (e.g., an unsprung portion) and some or all of the rest of the vehicle that is not in contact with the surface (e.g., a suspended portion). For example, the unsprung portion of the vehicle that is in contact with the surface can include one or more wheel(s), skis, tracks, hulls, etc., while some or all of the rest of the vehicle that is not in contact with the surface include suspended portions such as a frame, a seat, handlebars, engines, cranks, etc.

The suspension system will include one or numerous components which are used to couple the unsprung portion of the vehicle (e.g., wheels, skids, wings, etc.) with the suspended portion of the vehicle (e.g., seat, cockpit, passenger area, cargo area, etc.). Often, the suspension system will include one or more telescopic assemblies which are used to reduce feedback from the unsprung portion of the vehicle before that feedback is transferred to the suspended portion of the vehicle, as the vehicle traverses an environment. However, the language used by those of ordinary skill in the art to identify a telescopic assembly used within the suspension system can differ while referring to the same (or similar) types of components. For example, some of those of ordinary skill in the art will refer to a telescopic assembly as a shock absorber (or shock assembly etc.), while others of ordinary skill in the art will refer to the telescopic assembly as a damper (or damper assembly).

However, the telescopic assembly disclosed herein is not limited to the use of a vehicle suspension system. The telescopic assembly may be coupled with a screen door (or the like) to reduce the speed of closure and/or return an open door to a closed position. In another embodiment, the telescopic assembly may be used to hold the hood of a vehicle, the trunk of a car, etc. in an open position. In another embodiment, the telescopic assembly is used on a suspension inclusive device such as, but not limited to an exoskeleton, a seat frame, a prosthetic, an orthotic, a suspended floor, and the like.

Embodiments of the present invention are well suited to any environment where a telescopic assembly is beneficial for energy storage and/or dissipation.

A telescopic assembly often comprises a (damping) piston and piston rod telescopically mounted in a fluid filled cylinder (e.g., a housing). The fluid (e.g., damping fluid, working fluid, etc.) may be, for example, a hydraulic oil, a gas such as nitrogen, air, or the like. In one embodiment, the adjustable telescopic assembly will include a mechanical spring (e.g., a helically wound spring that surrounds or is mounted in parallel with the body of the adjustable telescopic assembly). In one embodiment, the telescopic assembly will include an air spring. In one embodiment, the telescopic assembly will include both a mechanical spring and an air spring.

In telescopic assemblies that do not have a through shaft, the available fluid volume within a chamber changes as the shaft moves in and out of the chamber. For example, the maximum amount of working fluid which can be held within the chamber is limited by the shaft. In other words, when the telescopic assembly is completely compressed and the shaft is taking up its maximum volume within the chamber, the remaining fluid volume can be filled with the working fluid. As such, when the shaft is at least partially withdrawn from the chamber, the reduction in shaft volume within the chamber results in an increase in the amount of available fluid volume within the chamber. In a most basic telescopic assembly, that space is filled with air. Deleteriously, during operation of the telescopic assembly the motion of the piston within the chamber can incorporate the air into the working fluid which is often referred to as emulsion. Basically, during emulsion, as the piston pushes on the working fluid, it also has to push the air bubbles out of the working fluid resulting in a reduced damping response.

This problem is often solved using a gas (such as Nitrogen) and an internal floating piston (IFP) to keep the working fluid separate from the gas. For example, in a pure monotube FOX shock the IFP is in-line with the main body separating the working fluid from the gas.

IFP wobble occurs during movement in one or both of the compression direction and/or extension direction. The wobble is unpredictable and is due to a number of factors such as, but not limited to, gasification of the liquid and/or liquid loss into the gas chamber.

One solution is to use a seal in combination with a guide ring for the IFP. By using two contact points (e.g., seal and guide ring) IFP wobble will be reduce and tipping is prevented. While this solution is elegant, using the seal in combination with the guide ring expands the "dead space" footprint of the IFP. That is, the axial length of the IFP volume consumption within the chamber (reducing an available volume for either or both the gas and liquid) will include not only the guide ring and the seal but also the volume found between the two.

In many telescopic assemblies, the diameter of the chamber is large enough that the "dead space" displacement of the IFP does not deleteriously affect the operation of the telescopic assembly. However, in a telescopic assembly with a smaller and/or size restricted chamber axial length and/or diameter, the size and "dead space" displacement of the IFP becomes deleterious to the operation of the telescopic assembly. For example, the "dead space" reduces the available volume of either or both of the gas side and the fluid side of the IFP. When the available volume of the fluid side is reduced, the range of operation (e.g., stroke) of the telescopic assembly is deleteriously affected. When the available volume of the gas side is reduced, the operating pressure of the gas side of the IFP will have to be higher to properly perform which will result in a noticeably firmer softest setting. In contrast, if the operating pressure of the gas side of the IFP is not raised, the reduced available gas volume causes the IFP to move to its compressed limit sooner resulting in a hard stop before the desired range of operation of the telescopic assembly was reached.

Embodiments provided herein disclose a new and novel IFP with design features to prevent tipping of the IFP. In one embodiment, the length of the IFP is extended to provide a larger base to prevent rotation. In one embodiment, the IFP, or a portion thereof, contacts the IFP chamber ID to prevent tipping. In one embodiment, at least two points of contact are used to maintain the IFP, one point of contact is a seal (O-ring, quad ring, etc.). Another is the extended supporting region of the IFP. In one embodiment, the extended supporting region is a secondary full diameter region. In one embodiment, the extended supporting region includes one or more tabs extending from the IFP body. In one embodiment, the extended supporting region includes a secondary full diameter region and one or more tabs extending therefrom to support the IFP and prevent any IFP tipping. In one embodiment, the anti-tipping features are made with minimal material to reduce IFP displacement volume.

With reference now to FIG. 1, an IFP 25 is shown in accordance with an embodiment. In one embodiment, IFP 25 includes a seal 1 within a seal channel 2 (defined by at least two walls e.g., wall 3 and wall 4) and an anti-tipping feature located a distance from the seal channel 2. In one embodiment, seal 1 is an O-ring. In one embodiment, seal 1 is another type of seal such as, a quad ring, and the like.

In one embodiment, the anti-tipping feature is a circumferential anti-tipping feature 8 with a contact surface. In one embodiment, the circumferential anti-tipping feature 8 is formed axially (e.g., indicated by axis 13) about the OD 15 of the IFP 25. In one embodiment, circumferential anti-tipping feature 8 is fixedly coupled with at least one wall (e.g., wall 4) of the seal channel 2 and is separated therefrom by a stand-off 5 (e.g., the area between the circumferential anti-tipping feature 8 and the seal channel 2). In one embodiment, the stand-off 5 provides enough axial distance between the circumferential anti-tipping feature 8 and the seal channel 2 to prevent tipping and/or binding of the IFP 25.

In one embodiment, one or more openings 7 (e.g., holes, slots, other geometric shapes, and the like) are formed through the circumferential anti-tipping feature 8 portion of the IFP 25 to allow fluid (either gas or liquid) to fill in the space between the circumferential anti-tipping feature 8 and the seal 1 of the IFP 25. In so doing, the "dead space" length of the IFP 25 is no longer dependent upon the axial distance (e.g., axis 13) between the circumferential anti-tipping feature 8 and the seal 1, but is instead only the width of the seal channel 2.

In one embodiment, the circumferential anti-tipping feature 8 and the seal channel 2 are a first diameter (e.g., the OD 15 of the IFP 25) while stand-off 5 of the IFP 25 has a diameter 17 smaller than OD 15. In one embodiment, at least a portion of the stand-off 5 will have at least one fluid pathway at least partially therein. In one embodiment, at least a portion of the stand-off 5 will have at least one fluid pathway at least partially therethrough. In one embodiment, the at least one fluid pathway will reduce a displacement volume of the IFP. In one embodiment, the IFP 25 has an hourglass type axial shape (or other geometric shape such as a rectangle, square, triangle, etc.). By having a smaller diameter 17 of stand-off 5, the reduced middle volume of the IFP 25 will provide an increase in the available chamber volume for the chamber. That is, the fluid (gas or liquid) that passes through the openings 7 in the circumferential anti-tipping feature 8 will be able to fill up the available space provided by the missing stand-off 5 volume of the IFP 25.

In one embodiment, the axial length of stand-off 5, e.g., between the seal channel 2 and the circumferential anti-tipping feature 8 is based upon the ID of the chamber as discussed in more detail herein.

In one embodiment, IFP 25 includes a fill path that allows fluid flow through the IFP. In one embodiment, the fill path is opened and/or closed with a fill screw 9 (or bolt, fastener, stopper, or the like). For example, during assembly, the fill path is open as the IFP 25 is installed in the chamber 41. The IFP 25 is then set to its desired height within the chamber 41. Once the IFP 25 height is set, the fluid is filled into chamber 41 via the fill path, after which fill screw 9 is used to close the fill path thereby sealing the fluid flow path through the IFP 25.

In one embodiment, the IFP 25 including the seal channel 2, stand-off 5, circumferential anti-tipping feature 8, and/or openings 7 are formed from a single piece. In one embodiment, the single piece IFP 25 is milled, cast, or the like. In one embodiment, one or more components of the seal channel 2, stand-off 5, circumferential anti-tipping feature 8, and/or openings 7 are formed separately and coupled together to form the IFP 25.

In one embodiment, IFP 25 is formed from a material with a low coefficient of friction such that the contact surfaces between the IFP 25 and the chamber inner wall is also low friction. In one embodiment, a material with a low coefficient of friction is added to some or all of the OD 15 of the IFP 25 that will encounter the chamber inner wall. For example, the IFP 25 is formed of a lightweight material (e.g., titanium, etc.) and a Teflon coating (or other material with a low coefficient of friction) is coupled with some or all of the OD 15 of channel walls 3 and 4 and/or circumferential anti-tipping feature 8 to reduce any friction caused by the IFP 25 encountering the inner wall of the chamber (shown in further detail in FIGS. 4A and 4B).

Figure 2:
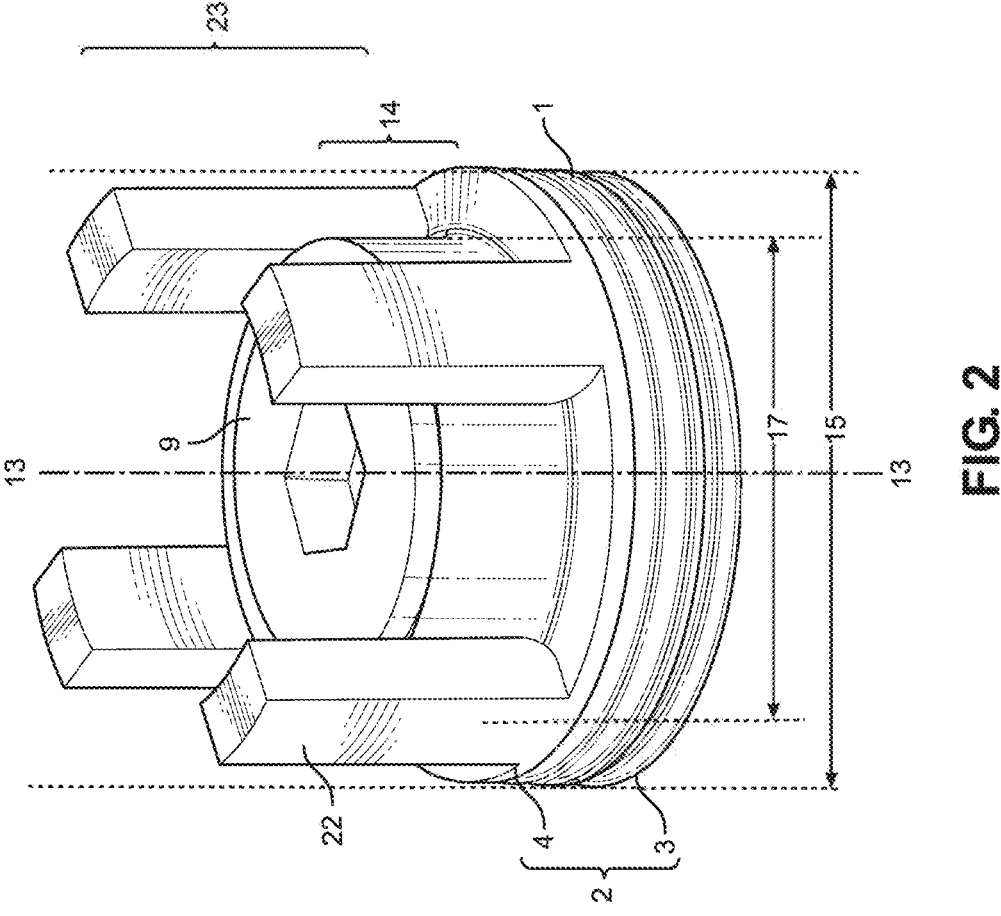
FIG. 2 is a perspective view of an IFP with an anti-tipping feature, shown in accordance with an embodiment

With reference now to FIG. 2, an IFP 50 with an anti-tipping feature is shown in accordance with an embodiment. For purposes of clarity, the components and/or functionality of FIG. 2 that are the same or similar to the components and/or functionality already described in FIG. 1 is not repeated, but instead the entirety of any components and/or functionality discussions provided herein is incorporated by reference.

In one embodiment, IFP 50 includes a seal 1 within a seal channel 2 (defined by at least two walls e.g., wall 3 and wall 4) and an anti-tipping feature. In one embodiment, IFP 50 includes a fill path that allows fluid flow through the IFP. In one embodiment, the fill path is opened and/or closed with a fill screw 9 (or bolt, fastener, stopper, or the like). In one embodiment, seal 1 is an O-ring. In one embodiment, seal 1 is another type of seal such as, a quad ring, and the like.

In one embodiment, instead of having a circumferential anti-tipping feature 8, the anti-tipping feature of IFP 50 is a plurality of tangs 22. In one embodiment, the plurality of tangs 22 are formed with an OD 15 similar to the seal channel 2 diameter of the IFP 50 to provide anti-tipping support. In one embodiment, the plurality of tangs 22 provide anti-binding support. In one embodiment, the plurality of tangs 22 are shown as somewhat rectangular. In one embodiment, one or more of the plurality of tangs 22 are formed of other geometric shapes.

In one embodiment, the plurality of tangs 22 are formed axially (e.g., indicated by axis 13) about the OD 15 of the IFP 50. In one embodiment, the plurality of tangs 22 are fixedly coupled with at least one wall (e.g., wall 4) of the seal channel 2. In one embodiment, each of the plurality of tangs 22 are separated by one or more narrow sections 14. In one embodiment, the narrow sections 14 provide enough axial length for the IFP 25 to house the fill path and fill screw 9.

In one embodiment, the one or more narrow sections 14 (e.g., holes, slots, other geometric shapes, and the like) allow fluid (either gas or liquid) to fill in the space between the plurality of tangs 22 and the seal 1 of the IFP 50. In so doing, the "dead space" length of the IFP 50 is no longer dependent upon the axial distance (e.g., axis 13) between the anti-tipping feature and the seal 1, but is instead only the width of the seal channel 2.

In one embodiment, the plurality of tangs 22 and the seal channel 2 are a first diameter (e.g., the OD 15 of the IFP 50) while the one or more narrow sections 14 of the IFP 50 have a diameter 17 smaller than OD 15. In one embodiment, at least a portion of the one or more narrow sections 14 will have at least one fluid pathway at least partially therein. In one embodiment, at least a portion of the one or more narrow sections 14 will have at least one fluid pathway at least partially therethrough. In one embodiment, the at least one fluid pathway will reduce a displacement volume of the IFP. In one embodiment, having a smaller diameter 17 of one or more narrow sections 14 will reduce the volume of the IFP 50 and, as such, provide an increase in the available chamber volume for the fluid in the chamber. That is, the fluid (gas or liquid) within the chamber will be able to fill up the available space provided by the missing volume of the one or more narrow sections 14 of IFP 50.

In one embodiment, the axial length of the tangs 22, extending from the seal channel 2 is based upon the ID of the chamber as discussed in more detail herein.

In one embodiment, one or more of the plurality of tangs 22 are shaped to provide the least amount of added IFP 50 volume while having a structural integrity that provides resistance against bending and/or deformation of the tang such that the tang's anti-tipping and/or anti-binding capabilities are not detrimentally affected. For example, in one embodiment, one or more tangs 22 (or portions of one or more tangs) include a scaffolding type architecture to provide the required amount of strength with the least amount of structural volume. In so doing, the reduced structural volume of the tangs 22 provides an increase in the available fluid volume in the chamber.

In one embodiment, the one or more tangs 22 are used to control any rotation of the IFP as the fill screw 9 is manipulated to close the fill path.

In one embodiment, the IFP 50 including the seal channel 2 and tangs 22 are formed from a single piece. In one embodiment, the single piece IFP 50 is milled, cast, or the like. In one embodiment, one or more components of the seal channel 2 and tangs 22 are formed separately and coupled together to form the IFP 50.

In one embodiment, the IFP 50 is formed from a material with a low coefficient of friction such that the contact surfaces between the IFP 50 and the chamber inner wall is also low friction. In one embodiment, a material with a low coefficient of friction is added to some or all of the OD 15 of the IFP 50 that will encounter the chamber inner wall. For example, the IFP 50 is formed of a lightweight material (e.g., titanium, etc.) and a Teflon coating (or other material with a low coefficient of friction) is coupled with some or all of the OD 15 of tangs 22 and/or channel walls 3 and 4 to reduce any friction caused by the IFP 50 encountering the inner wall of the chamber (shown in further detail in FIG. 5).

Figure 3:
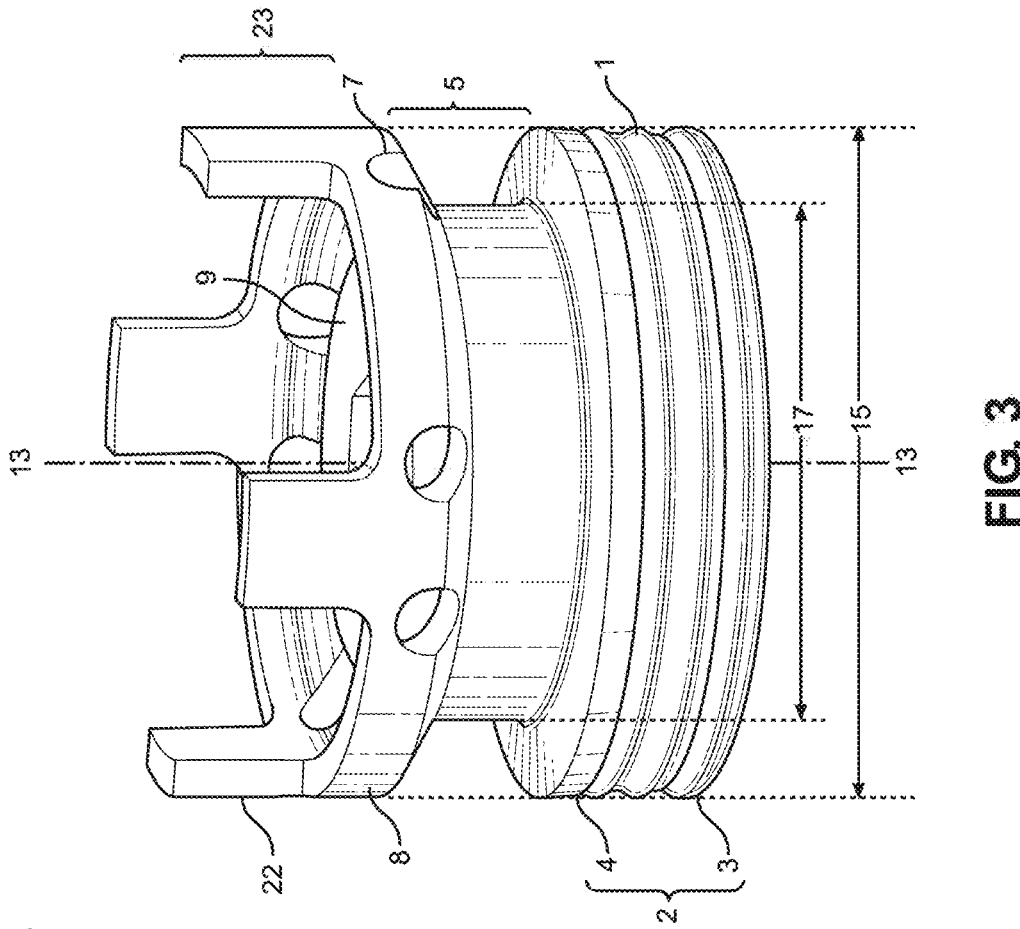
FIG. 3 is a perspective view of an IFP with an anti-tipping feature, shown in accordance with an embodiment.

With reference now to FIG. 3, an IFP 75 with an anti-tipping feature is shown in accordance with an embodiment. For purposes of clarity, the components and/or functionality of FIG. 3 that are the same or similar to the components and/or functionality already described in FIGS. 1 and 2 is not repeated, but instead the entirety of any components and/or functionality discussions provided herein is incorporated by reference.

In one embodiment, IFP 75 includes a seal 1 within a seal channel 2 (defined by at least two walls e.g., wall 3 and wall 4) and an anti-tipping feature. In one embodiment, IFP 75 includes a fill path that allows fluid flow through the IFP. In one embodiment, the fill path is opened and/or closed with a fill screw 9 (or bolt, fastener, stopper, or the like). In one embodiment, seal 1 is an O-ring. In one embodiment, seal 1 is another type of seal such as, a quad ring, and the like.

In one embodiment, the anti-tipping feature of IFP 75 includes both the circumferential anti-tipping feature 8 and a plurality of tangs 22. In one embodiment, the circumferential anti-tipping feature 8 is similar to the circumferential anti-tipping feature 8 of FIG. 1. In one embodiment, the plurality of tangs 22 are similar to the plurality of tangs 22 of FIG. 2. In one embodiment, the circumferential anti-tipping feature 8 and/or plurality of tangs 22 are formed axially (e.g., indicated by axis 13) about the OD 15 of the IFP 75.

In one embodiment, circumferential anti-tipping feature 8 is fixedly coupled with at least one wall (e.g., wall 4) of the seal channel 2 and is separated therefrom by a stand-off 5 (e.g., the area between the circumferential anti-tipping feature 8 and the seal channel 2). In one embodiment, one or more tangs 22 are coupled with the circumferential anti-tipping feature 8 portion of the IFP 75. In one embodiment, the one or more tangs 22 are used in conjunction with the circumferential anti-tipping feature 8 portion of the IFP 75 to provide additional anti-tipping support.

In one embodiment, the stand-off 5 provides enough axial distance between the circumferential anti-tipping feature 8 and the seal channel 2 to prevent tipping and/or binding of the IFP 25.

In one embodiment, one or more openings 7 (e.g., holes, slots, other geometric shapes, and the like) are formed through the circumferential anti-tipping feature 8 and the plurality of tangs 22 of the IFP 75 to allow fluid (either gas or liquid) to fill in the space between the plurality of tangs 22, the circumferential anti-tipping feature 8, and the seal 1 of the IFP 75. In so doing, the "dead space" length of the IFP 75 is no longer dependent upon the axial distance (e.g., axis 13) between the anti-tipping feature and the seal 1, but is instead only the width of the seal channel 2.

In one embodiment, the circumferential anti-tipping feature 8, plurality of tangs 22, and the seal channel 2 are a first diameter (e.g., the OD 15 of the IFP 75) while stand-off 5 of the IFP 75 has a diameter 17 smaller than OD 15. In one embodiment, at least a portion of the stand-off 5 will have at least one fluid pathway at least partially therein. In one embodiment, at least a portion of the stand-off 5 will have at least one fluid pathway at least partially therethrough. In one embodiment, the at least one fluid pathway will reduce a displacement volume of the IFP. In one embodiment, the IFP 75 has an hourglass type axial shape (or other geometric shape such as a rectangle, square, triangle, etc.). By having a smaller diameter 17 of stand-off 5, the reduced middle volume of the IFP 75 will provide an increase in the available chamber volume for the chamber. That is, the fluid (gas or liquid) that passes through the openings 7 in the circumferential anti-tipping feature 8 will be able to fill up the available space provided by the missing stand-off 5 volume of the IFP 75.

In one embodiment, the axial length of stand-off 5, e.g., between the seal channel 2 and the circumferential anti-tipping feature 8 and one or more tangs 22 is based upon the ID of the chamber as discussed in more detail herein.

In one embodiment, the one or more tangs 22 are used to control any rotation of the IFP as the fill screw 9 is manipulated to close the fill path.

In one embodiment, IFP 75 including the seal channel 2, stand-off 5, circumferential anti-tipping feature 8, openings 7, and/or tangs 22 are formed from a single piece. In one embodiment, the single piece IFP is milled, cast, or the like. In one embodiment, one or more components of the seal channel 2, circumferential anti-tipping feature 8, openings 7, and/or tangs 22 are formed separately and coupled together to form the IFP 75.

In one embodiment, IFP 75 is formed from a material with a low coefficient of friction such that the contact surfaces between the IFP 75 and the chamber inner wall is also low friction. In one embodiment, a material with a low coefficient of friction is added to some or all of the OD 15 of the IFP 75 that will encounter the chamber inner wall. For example, the IFP 75 is formed of a lightweight material (e.g., titanium, etc.) and a Teflon coating (or other material with a low coefficient of friction) is coupled with some or all of the OD 15 of channel walls 3 and 4, circumferential anti-tipping feature 8, and/or tangs 22 to reduce any friction caused by the IFP 75 encountering the inner wall of the chamber (shown in further detail in FIGS. 6A and 6B).

Figures 4A, 4B:
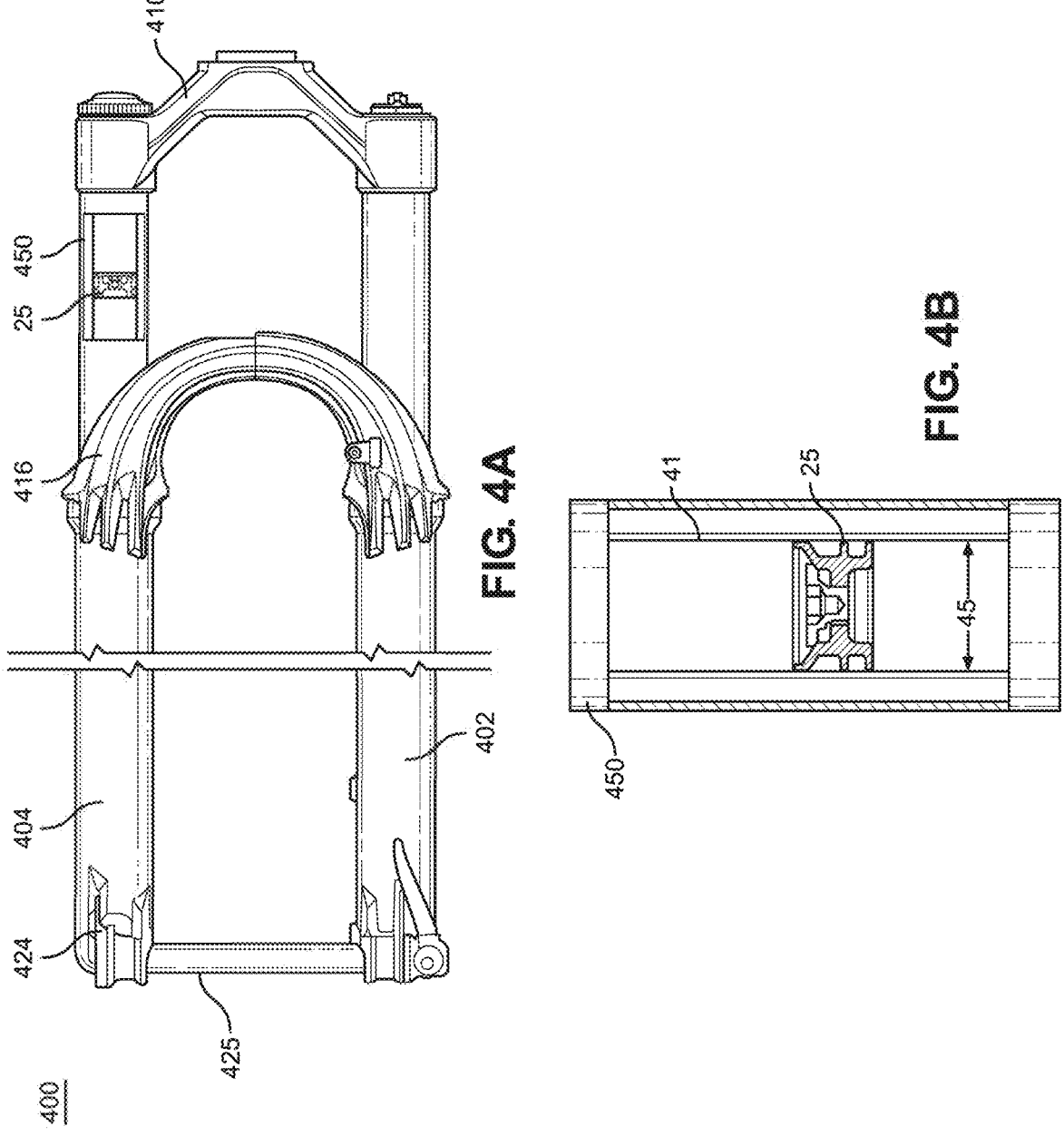
FIG. 4A is a perspective view of a telescopic assembly having an IFP, shown in accordance with an embodiment.
FIG. 4B is a cutaway view of the telescopic assembly with the IFP of FIG. 4A, shown in accordance with an embodiment.

Referring now to FIG. 4A, a perspective view of a telescopic assembly 400 is shown in accordance with an embodiment. In one embodiment, telescopic assembly 400 is a fork assembly. In general, the telescopic assembly 400 is used on a vehicle such as a bicycle, electric bike (e-bike), moped, motorcycle, and the like. The telescopic assembly 400 include right and left legs, 402 and 404.

In a "normal" configuration, the right leg 402 includes a right upper tube telescopingly received in a right lower tube. Similarly, the left leg 404 includes a left upper tube telescopingly received in a left lower tube.

In an inverted configuration, the telescoping of the legs is inverted. That is, the right lower tube of right leg 402 is telescopingly received in the right upper tube. Similarly, the left lower tube of left leg 404 is telescopingly received in the left upper tube.

A crown 410 of telescopic assembly 400 connects the right upper tube of right leg 402 to the left upper tube of left leg 404. In addition, the crown 410 supports a steerer tube, which passes through, and is rotatably supported by, the frame of the vehicle.

In one embodiment, the right leg 402 and the left leg 404 includes dropouts 424 and 426, respectively, for connecting a front wheel to telescopic assembly 400 via a front axle 425. In one embodiment, an arch 416 connects the right lower tube of right leg 402 and the left lower tube of left leg 404 to provide strength and minimize twisting thereof.

In one embodiment, telescopic assembly 400 includes an IFP such as IFP 25. Although IFP 25 is shown, it should be appreciated that other versions of the IFP may be utilized with telescopic assembly 400. The use of IFP 25 in FIGS. 4A and 4B is provided for purposes of clarity.

In one embodiment, telescopic assembly 400 includes a second telescopic assembly 450 in at least one fork leg. In one embodiment, second telescopic assembly 450 includes an IFP such as described herein.

Additional detail and description of a telescopic assembly are disclosed in, as an example, U.S. Pat. No. 10,576,803 the content of which is incorporated by reference herein, in its entirety. For additional detail and description of position-sensitive telescopic assembly, see U.S. Pat. No. 6,296,092 the content of which is incorporated by reference herein, in its entirety.

With reference now to FIG. 4B, a cutaway view of the second telescopic assembly 450 for telescopic assembly 400 of FIG. 4A is shown in accordance with an embodiment. In one embodiment, second telescopic assembly 450 is an air spring, a coil spring, or the like.

In general, second telescopic assembly 450 includes a chamber 41 having an ID 45. A piston within the chamber 41 dividing the chamber into a rebound side and a compression side, and IFP. Although any of the IFP's discussed herein are able to be used, in this example, one embodiment of the second telescopic assembly 450 utilizes IFP 25.

With reference now to FIG. 4B and to FIG. 1, in one embodiment, the OD 15 of the seal channel 2 (as measured from the outer walls 3 and 4) and the circumferential anti-tipping feature 8 of the IFP is a slip fit such that the OD 15 of the seal channel 2 and circumferential anti-tipping feature 8 is marginally smaller than the ID 45 of the chamber 41. In general, the slip fit is used to reduce or remove an opportunity for any deleterious stoppages of the IFP 25 within the chamber 41 which occur due to temperature induced expansion/contraction, particulates, and the like.

In one embodiment, seal 1 (or seals) is used in the seal channel 2 to fill in the gap (e.g., the slip fit tolerance) between the IFP 25 OD 15 and the chamber ID 45; and fluidly seal the IFP 25 with the chamber 41 when installed.

In one embodiment, the slip fit tolerance is approximately 5 thousandths. That is, in one embodiment IFP 25 OD 15 is approximately 5 thousandths smaller than the chamber ID 45. In one embodiment, the slip fit is a different tolerance. In one embodiment, the slip fit tolerance is based on the thickness of the seal 1 used by the IFP 25. For example, if a larger slip fit tolerance (e.g., 20 thousandths) is used, the seal 1 (or seals) would be thicker to ensure a proper seal is formed between the IFP 25 and the chamber 41 wall such that the gas and liquid remain separated while the IFP 25 is still be able to move within the chamber 41 in both the compression and extension directions. Similarly, if a smaller slip fit tolerance (e.g., 3 thousandths) is used, in one embodiment, the seal 1 (or seals) is thinner to ensure a proper seal is formed between the IFP 25 and the chamber 41 wall such that the gas and liquid remain separated while the IFP 25 is still be able to move within the chamber 41 in both the compression and extension directions.

Figure 5:
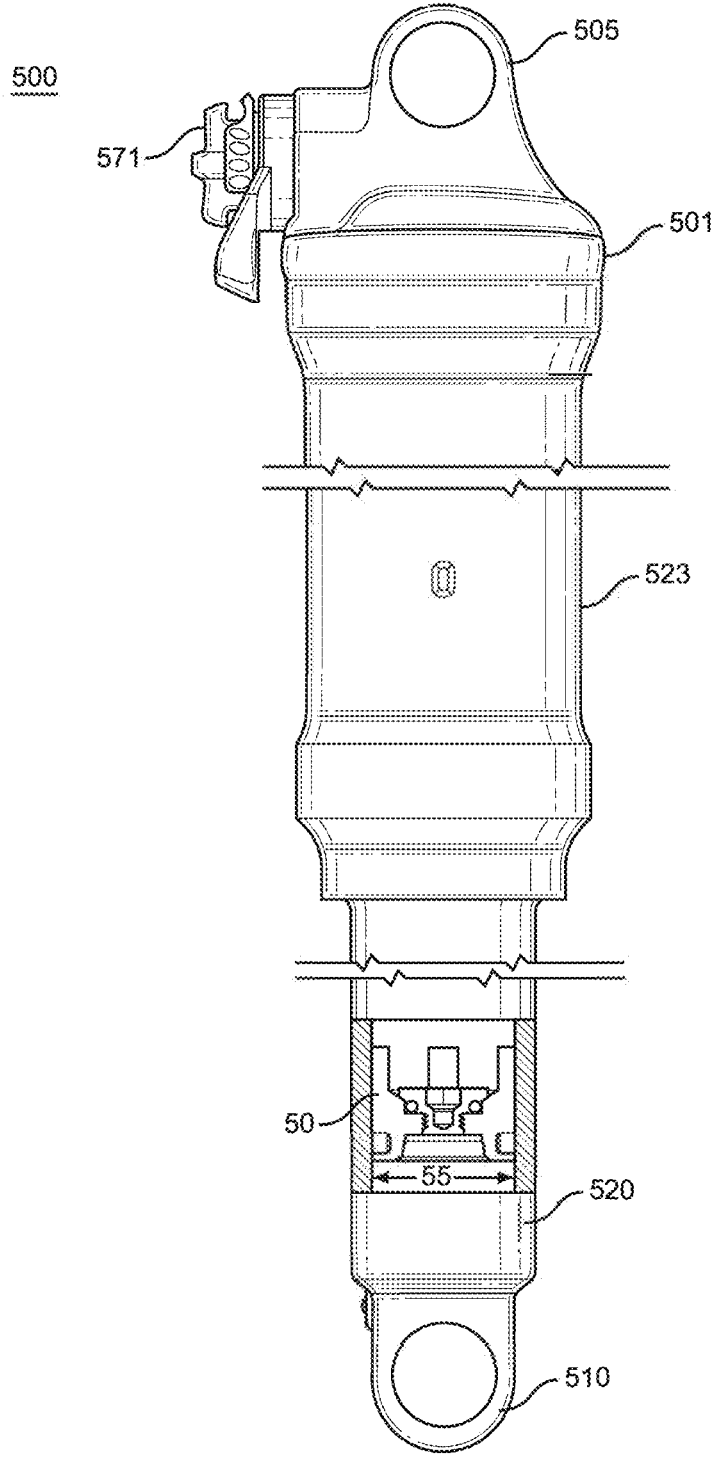
FIG. 5 is a perspective view of another telescopic assembly with an IFP, shown in accordance with an embodiment.

With reference now to FIG. 5, a perspective view of another telescopic assembly 500 with IFP 50 is shown in accordance with an embodiment. In one embodiment, telescopic assembly 500 is a shock assembly. In one embodiment, telescopic assembly 500 includes a top cap portion 501, shaft end eyelet 505, lower eyelet 510, damper body 520, air sleeve 523, and adjustable valving 571. In one embodiment, telescopic assembly 500 includes an internal reservoir. In one embodiment, telescopic assembly 500 includes an external or piggyback type of reservoir.

In one embodiment, telescopic assembly 500 comprises an air spring. In one embodiment, telescopic assembly 500 comprises a coil spring or the like.

In general, telescopic assembly 500 includes a damper body 520 having an ID 55. A piston within the chamber 51 dividing the chamber into a rebound side and a compression side, and IFP. Although any of the IFP's discussed herein are able to be used, in this example, one embodiment of the telescopic assembly 500 utilizes IFP 50. Additional detail and description of a telescopic assembly 500 are disclosed in, as an example, U.S. Pat. No. 10,576,803 the content of which is incorporated by reference herein, in its entirety.

With reference now to FIG. 5 and to FIG. 2, in one embodiment, the OD 15 of the seal channel 2 (as measured from the outer walls 3 and 4) and the tangs 22 of the IFP 50 is a slip fit such that the OD 15 of the seal channel 2 and the tangs 22 is marginally smaller than the ID 55 of the chamber 51. In general, the slip fit is used to reduce or remove an opportunity for any deleterious stoppages of the IFP 50 within the chamber 51 which occur due to temperature induced expansion/contraction, particulates, and the like.

In one embodiment, seal 1 (or seals) is used in the seal channel 2 to fill in the gap (e.g., the slip fit tolerance) between the IFP 50 OD 15 and the chamber ID 55; and fluidly seal the IFP 50 with the chamber 51 when installed.

In one embodiment, the slip fit tolerance is approximately 5 thousandths. That is, in one embodiment IFP 50 OD 15 is approximately 5 thousandths smaller than the chamber ID 55. In one embodiment, the slip fit is a different tolerance. In one embodiment, the slip fit tolerance is based on the thickness of the seal 1 used by the IFP 50. For example, if a larger slip fit tolerance (e.g., 20 thousandths) is used, the seal 1 (or seals) would be thicker to ensure a proper seal is formed between the IFP 50 and the chamber 51 wall such that the gas and liquid remain separated while the IFP 50 is still be able to move within the chamber 51 in both the compression and extension directions. Similarly, if a smaller slip fit tolerance (e.g., 3 thousandths) is used, in one embodiment, the seal 1 (or seals) is thinner to ensure a proper seal is formed between the IFP 50 and the chamber 51 wall such that the gas and liquid remain separated while the IFP 50 is still be able to move within the chamber 51 in both the compression and extension directions.

In one embodiment, the axial length 23 of one or more of the tangs 22, the number of tangs 22, and/or the spacing of the tangs 22 is based upon the ID 55 of the chamber 51. For example, if the ID 55 of the chamber 51 is a first value the tangs 22 will be a first axial length 23, number, and/or spacing to ensure the IFP 50 with OD 15 does not tip or bind. In contrast, if the ID 55 of the chamber 120 is a second value, greater than the first value, the tangs 22 are a second axial length 23, number, and/or spacing to ensure the IFP 50 with the larger OD does not tip or within chamber 51 having ID 55.

In contrast, if the ID 55 of the chamber 51 is a second value, greater than the first value, the tangs 22 will be a second axial length 23, number, and/or spacing to ensure the IFP 50 did not tip or bind with the larger ID 55. Similarly, if the ID 55 of the chamber 51 is a second value, less than the first value, the tangs 22 will be a second axial length 23, number, and/or spacing to ensure the IFP 50 did not tip or bind within the smaller ID 55.

Figures 6A, 6B:
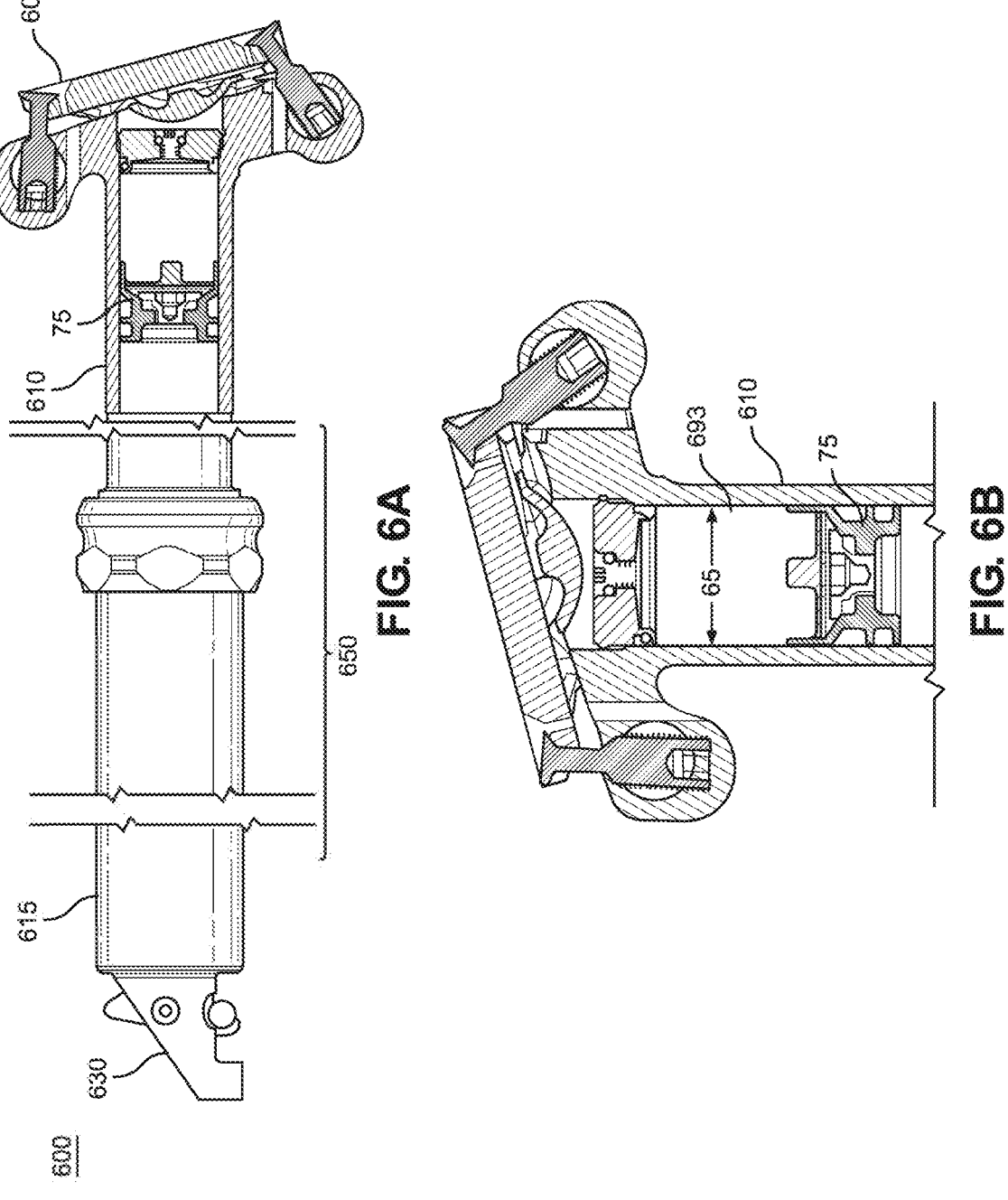
FIG. 6A is a perspective and partially cutaway view of another telescopic assembly having an IFP, shown in accordance with an embodiment.
FIG. 6B is a cutaway view of the telescopic assembly of FIG. 6A, shown in accordance with an embodiment.

Referring now to FIG. 6A, a perspective and partially cutaway view of a telescopic assembly 600 having IFP 75 is shown in accordance with an embodiment. In one embodiment, telescopic assembly 600 is a dropper seatpost. In general, telescopic assembly 600 is used on a vehicle such as a bicycle, electric bike (e-bike), moped, and the like. In one embodiment, the telescopic assembly 600 includes an upper post 610, a lower post 615, IFP 75, and a bottom 630.

In one embodiment, the upper post 610 and the lower post 615 are telescopically coupled together to form the telescopic assembly 600. In one embodiment, the upper post 610 includes the saddle clamp assembly 605 at a top thereof (e.g., at the end (or close to the end) of the upper post 610 opposite the end of the upper post telescopically coupled with the lower post 615). In one embodiment, the lower post 615 is inserted into and then fixedly coupleable with a seat tube of a vehicle.

In one embodiment, a user can operate a control lever to "drop" the telescopic assembly 600 to a lower setting (e.g., the saddle clamp assembly 605 is approximately at the top of the lower post 615), and then use the same control lever to "return" the telescopic assembly 600 to its preset ride height. This capability allows a rider to have a preferred saddle ride height and also a lowered saddle height for traversing downhills, bumpy terrain, while standing on the pedals, or the like. Although two positions is discussed, the telescopic assembly 600 could be adjustable to any number of different ride height positions, the use of two positions is discussed herein for purposes of clarity.

In general, telescopic assembly 600 may be made of various materials, such as, but not limited to: steel, aluminum, titanium, carbon fiber, and aluminum wrapped in carbon fiber. Additional detail and description of a telescopic assembly and the operation thereof is found in U.S. Pat. Nos. 9,422,018; 9,963,181; 10,427,742; and 11,091,215 which are incorporated herein by reference in their entirety.

With reference now to FIG. 6B, a cutaway view of FIG. 6A is shown in accordance with an embodiment.

In general, upper post 610 includes a chamber 693 having an ID 65. Although any of the IFP's discussed herein are able to be used, in this example, one embodiment of the telescopic assembly 600 utilizes IFP 75.

With reference now to FIG. 6B and to FIG. 3, in one embodiment, the OD 15 of the seal channel 2 (as measured from the outer walls 3 and 4), the circumferential anti-tipping feature 8, and the tangs 22 of the IFP 75 is a slip fit such that the OD 15 of the seal channel 2, circumferential anti-tipping feature 8, and the tangs 22 is marginally smaller than the ID 65 of the chamber 693. In general, the slip fit is used to reduce or remove an opportunity for any deleterious stoppages of the IFP 75 within the chamber 693 which occur due to temperature induced expansion/contraction, particulates, and the like.

In one embodiment, seal 1 (or seals) is used in the seal channel 2 to fill in the gap (e.g., the slip fit tolerance) between the IFP 75 OD 15 and the chamber ID 65; and fluidly seal the IFP 75 with the chamber 693 when installed.

In one embodiment, the slip fit tolerance is approximately 5 thousandths. That is, in one embodiment IFP 75 OD 15 is approximately 5 thousandths smaller than the chamber ID 65. In one embodiment, the slip fit is a different tolerance. In one embodiment, the slip fit tolerance is based on the thickness of the seal 1 used by the IFP 75. For example, if a larger slip fit tolerance (e.g., 20 thousandths) is used, the seal 1 (or seals) would be thicker to ensure a proper seal is formed between the IFP 75 and the chamber 693 wall such that the gas and liquid remain separated while the IFP 75 is still be able to move within the chamber 693 in both the compression and extension directions. Similarly, if a smaller slip fit tolerance (e.g., 3 thousandths) is used, in one embodiment, the seal 1 (or seals) is thinner to ensure a proper seal is formed between the IFP 75 and the chamber 693 wall such that the gas and liquid remain separated while the IFP 75 is still be able to move within the chamber 693 in both the compression and extension directions.

In one embodiment, the axial distance between the seal channel 2 and the circumferential anti-tipping feature 8 including one or more of the tangs 22, the number of tangs 22, and/or the spacing of the tangs 22 is based upon the ID 65 of the chamber 693. For example, if the ID 65 of the chamber 693 is a first value the stand-off 5, circumferential anti-tipping feature 8, and tangs 22 are a first axial length 23, number, and/or spacing to ensure the IFP 75 with OD 15 does not tip or bind within chamber 693 having ID 65.

In contrast, if the ID 65 of the chamber 693 is a second value, greater than the first value, the stand-off 5, circumferential anti-tipping feature 8, and tangs 22 would be a second axial length 23, number, and/or spacing to ensure the IFP 75 did not tip or bind with the larger OD. Similarly, if the ID 65 of the chamber 693 is a second value, less than the first value, the stand-off 5, circumferential anti-tipping feature 8, and tangs 22 would be a second axial length 23, number, and/or spacing to ensure the IFP 75 did not tip or bind within the smaller ID 65.

Figure 6C:
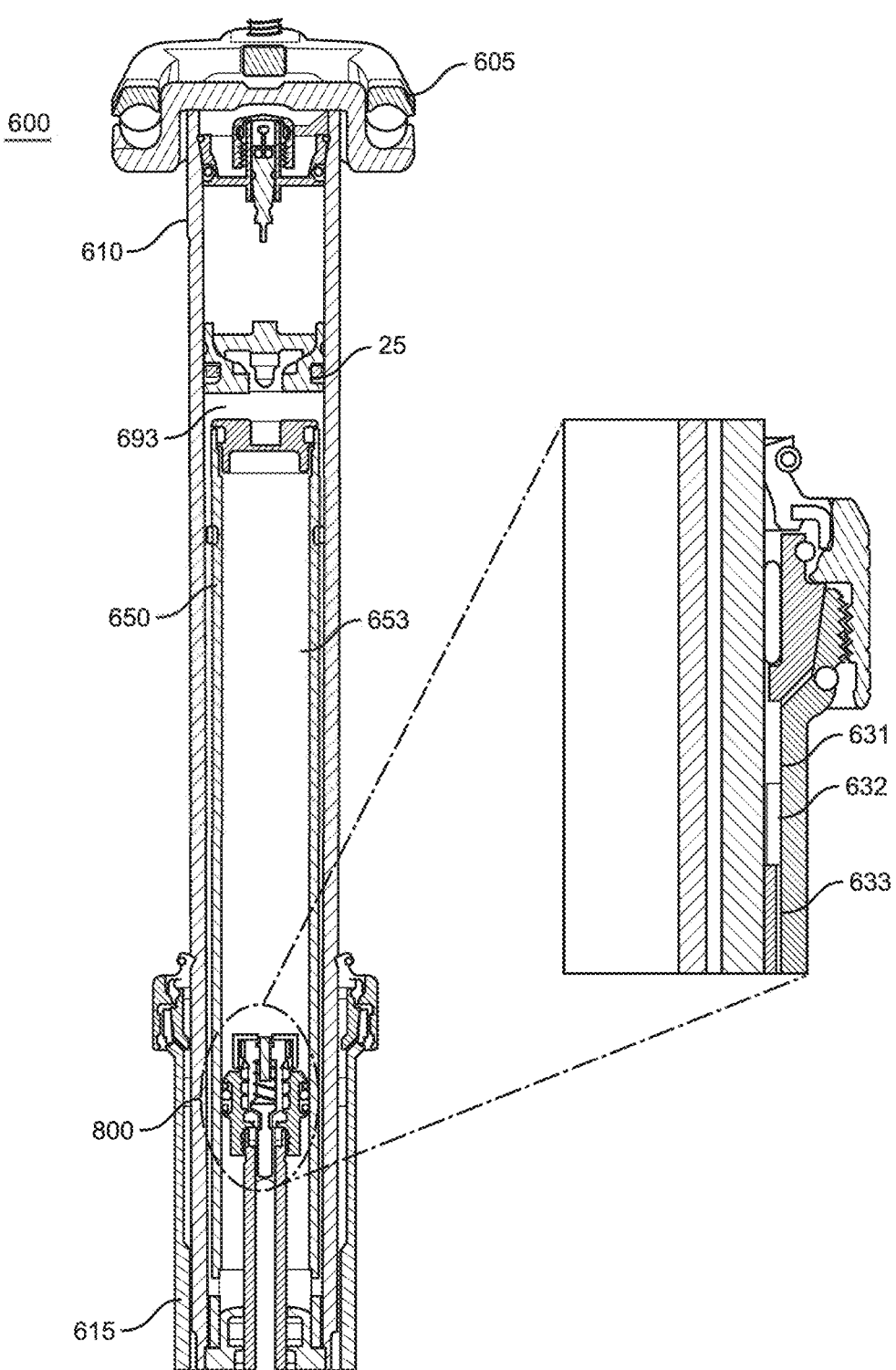
FIG. 6C is a section view of the telescopic assembly having the IFP and a pressure balanced valve with integral pressure relief function, shown in accordance with an embodiment.

Telescopic Assembly Having an IFP and a Pressure Balanced Valve with Integral Pressure Relief Function Referring now to FIG. 6C, a section view of a telescopic assembly 600 comprising a second telescopic assembly 650 therein (e.g., a coil spring assembly, air spring assembly, etc.) is shown in accordance with an embodiment. For purposes of clarity, the components and/or functionality of FIG. 6C that are the same or similar to the components and/or functionality already described in FIG. 6A is not repeated, but instead the entirety of any components and/or functionality discussions provided herein is incorporated by reference.

In one embodiment, second telescopic assembly 650 includes chamber 653 and piston 800 within the chamber 653 of upper post 610. In one embodiment, telescopic assembly 600 includes an IFP 25. Although IFP 25 is shown in FIG. 6C, it should be appreciated that the IFP could be any of the different IFP types disclosed herein (e.g., IFP 25, IFP 50, IFP 75, etc.). The use of IFP 25 is provided merely for purposes of clarity.

In one embodiment, the second telescopic assembly 650 controls the telescoping capability of the upper post 610 and lower post 615 configuration of telescopic assembly 600, such that a user can operate a control lever to "drop" the telescopic assembly 600 to a lower setting (e.g., the saddle clamp 605 is approximately at the top of the lower post 615), and then use the same control lever to "return" the telescopic assembly 600 to its preset ride height. This capability allows a rider to have a preferred saddle ride height and at least one lower saddle height for traversing downhills, bumpy terrain, while standing on the pedals, or the like. Although two positions is discussed, the telescopic assembly 600 could be adjustable to any number of different ride height positions, the use of two positions is discussed herein for purposes of clarity.

In one embodiment, second telescopic assembly 650 is a fluid spring telescopic assembly. In one embodiment, second telescopic assembly 650 is a different type such as a gas spring telescopic assembly or the like. In one embodiment, second telescopic assembly 650 is made of various materials, such as, but not limited to: steel, aluminum, titanium, carbon fiber, and aluminum wrapped in carbon fiber.

A-A is a sectional view of a portion of the telescopic assembly 600 in accordance with an embodiment. In general, section A-A shows a number of telescopic assembly 600 components that are affected by increases in the pressure within chamber 653. In general, when the pressure is increased within chamber 653 (e.g., due to temperature changes, impacts, etc.), the increased pressure acts as a downward force (e.g., from saddle clamp 605 toward piston 800) pushing piston 800 downward (e.g., causing telescopic assembly 600 to extend). This pressure results in the pin 633 attached to the upper post 610 pushing against the top out washer 632 and the travel spacer 631.

Figure 8A:
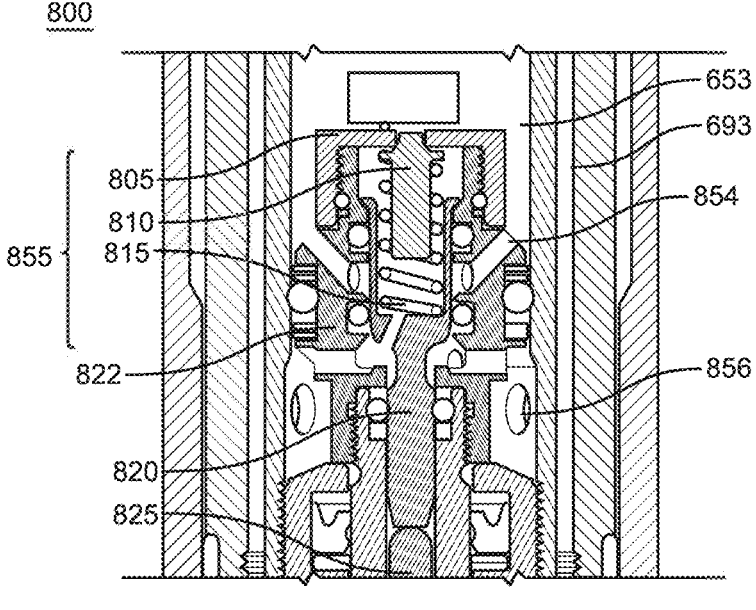
FIG. 8A is a section view of a piston having a closed spool valve and a pressure relieve valve, shown in accordance with an embodiment
Figure 8B:
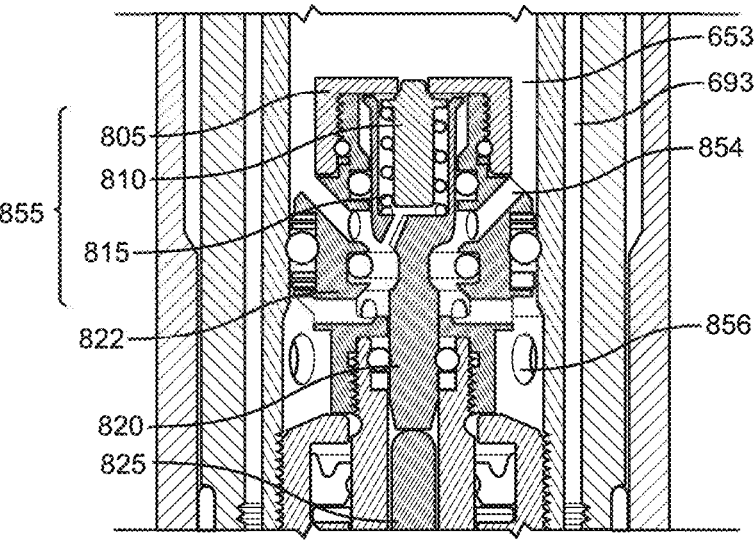
FIG. 8B is a section view of a piston having an open spool valve and a pressure relieve valve, shown in accordance with an embodiment
Figure 8C:
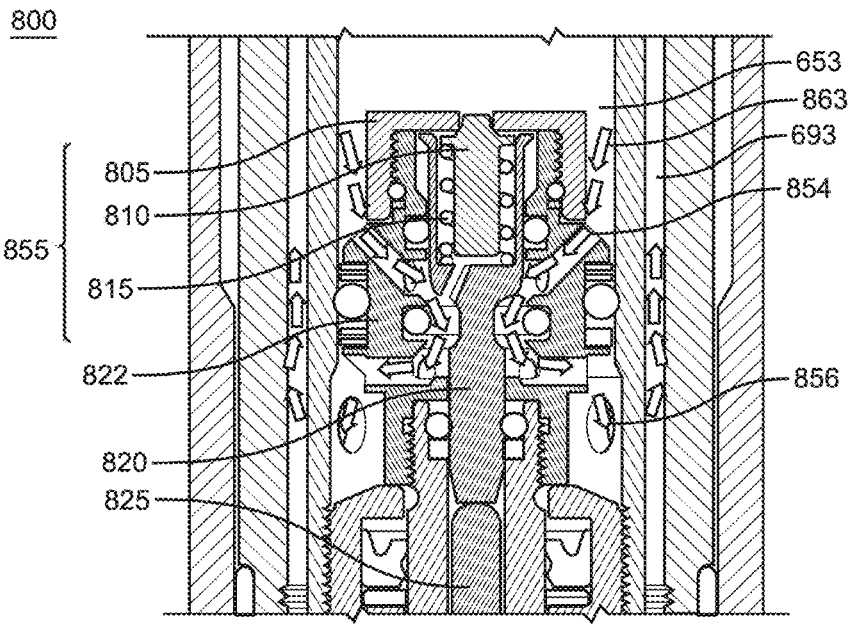
FIG. 8C is a section view of a piston having an open spool valve and a pressure relieve valve and a compressed fluid flowpath, shown in accordance with an embodiment
Figure 8D:
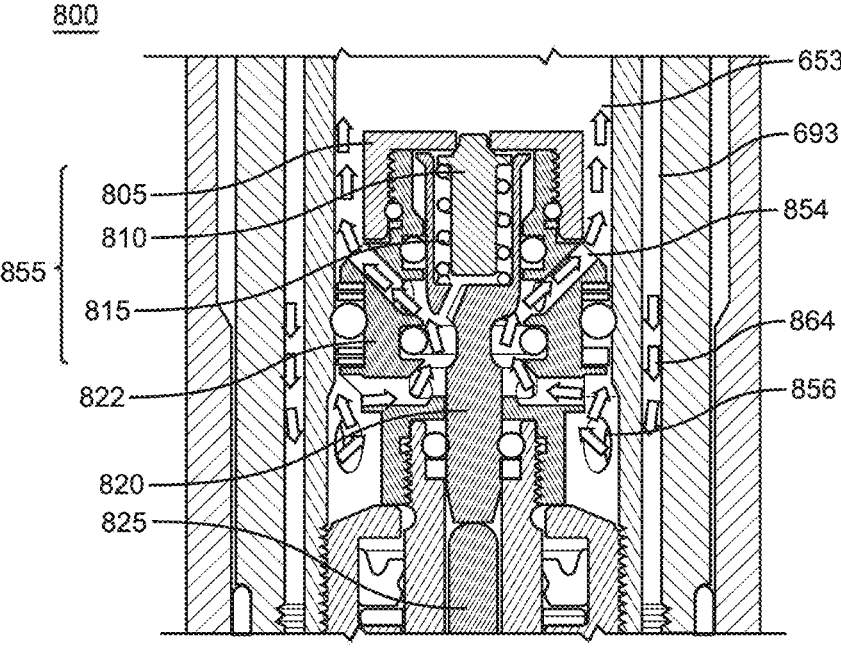
FIG. 8D is a section view of a piston having an open spool valve and a pressure relieve valve and an extension fluid flowpath, shown in accordance with an embodiment
Figure 9:
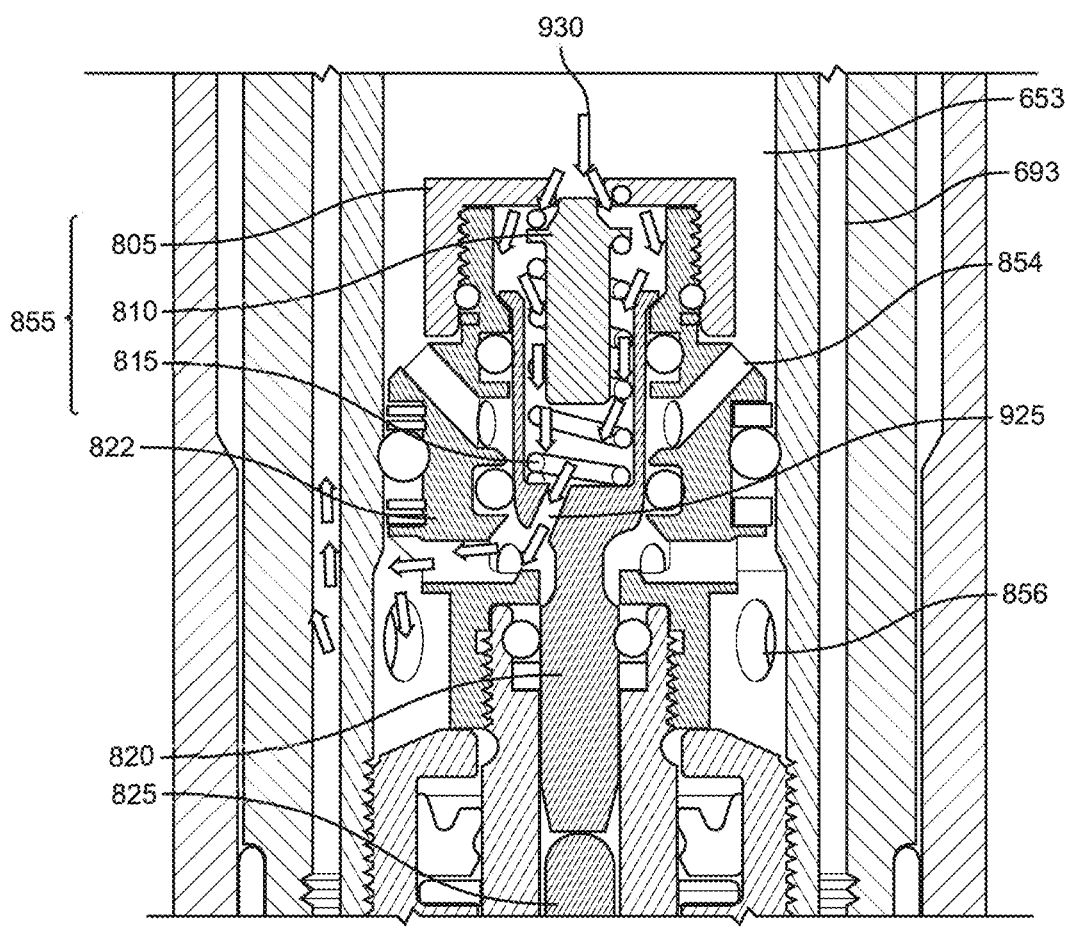
FIG. 9 is a section view of a piston having a closed spool valve and an activated pressure relieve valve, shown in accordance with an embodiment The drawings referred to in this description should be understood as not being drawn to scale except if specifically noted.

In one embodiment, this pressure is relieved by the pressure release valve in piston 800 which is described in detail in FIGS. 8A-9.

In the realm of telescopic assemblies and their utilization within different products, FOX is a leading innovator. As with many innovations that provide a solution to a scenario, application, and/or utilization additional solutions often flow from one inventive idea to the next. Moreover, as utilization of the products grow, there are calls for additional advances. For example, FOX has led the way with innovations that resolve hydrostatic lock due to thermal variations, weight changes, significant event performance impacts and the like.

One family of excellent innovations is the pressure relief valve. A number of ground breaking pressure relieve valve solutions and detailed description of the components and operation thereof are found in U.S. Pat. Nos. 9,422,018; 9,963,181; 10,427,742; and 11,091,215 which are incorporated herein by reference in their entirety.

Figure 7:
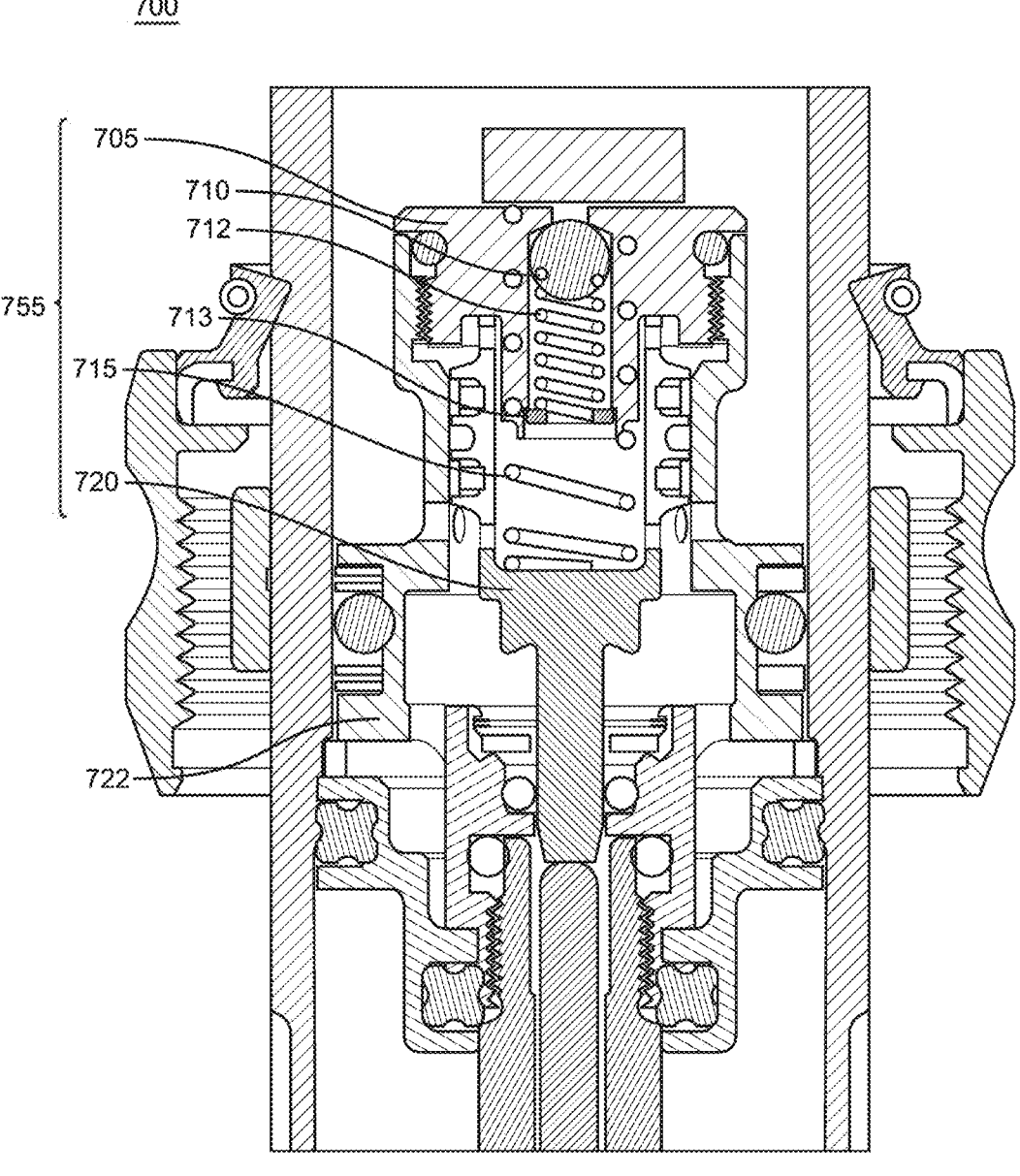
FIG. 7 is a section view of a ball type relief valve, shown in accordance with an embodiment.

With reference now to FIG. 7, an example of a ball type pressure relieve valve 755 for a piston 700 is shown in accordance with an embodiment. In general, ball type pressure relieve valve 755 includes an armature 705, ball 710, pressure relief spring 712, endcap 713, spool valve spring 715, and spool valve 720.

In one embodiment, armature 705 is coupled with body 722 and retains ball 710, pressure relief spring 712, endcap 713, spool valve spring 715, and spool valve 720 within body 722 of piston 700.

In one embodiment, ball 710 is held against armature 705 by the force of pressure relief spring 712 acting between ball 710 and endcap 713. In one embodiment, spool valve spring 715 is used to provide the operating force between armature 705 and spool valve 720.

With reference now to FIG. 8A, a piston 800 with a pressure relieve valve 855 is shown in accordance with an embodiment. In one embodiment, piston 800 includes a body 822, pressure relieve valve 855, and a spool valve 820. In one embodiment, a piston rod 825 is used to open or close spool valve 820. In FIG. 8A, the spool valve 820 is in a closed configuration.

In FIG. 8A, body 822 includes flow path(s) 854 which are closed (or blocked) by spool valve 820 when spool valve 820 is in the closed configuration. In one embodiment, chamber 653 includes port(s) 856 which allow fluid to flow between chamber 653 and chamber 693.

In one embodiment, pressure relief valve 855 includes a cap 805, a plunger 810, and a spring 815. In one embodiment, as described in more detail in FIG. 9, cap 805 has an opening filled by a portion of plunger 810 which is held against cap 805 by the force of spring 815. In one embodiment, spring 815 is also used to provide the operating force for operating spool valve 820.

In one embodiment, spring 815 is a single spring and is tuned (or selected) to provide the appropriate spring force to open spool valve 820. In one embodiment, since the single spring 815 provides the force needed to open spool valve 820, the spring force provided by spring 815 is not tuned to the pressure relief requirements of plunger 810. In one embodiment, the shape and/or available fluid surface area of plunger 810 (e.g., the portion of plunger 810 exposed to the fluid in chamber 653 when plunger 810 is seated against cap 805) is designed and/or established based upon the spring constant of spring 815 and the desired pressure relief setting.

In one embodiment, the opening in cap 805 is adjusted in conjunction with the available fluid surface area of plunger 810 to establish the relief pressure.

In one embodiment, cap 805 is threadedly coupled with body 822, such that the compression of spring 815 (and thus the force acting to hold plunger 810 against cap 805) is adjustable by the tightening (or loosening) of cap 805 with respect to body 822. E.g., for a higher blow-off pressure relief setting cap 805 would be threaded further with respect to body 822, and conversely for a lower blow-off pressure relief setting cap 805 would be more loosely threaded with respect to body 822.

In one embodiment, the plunger type pressure relief valve 855 of FIG. 8A has less components than the ball type pressure relieve valve 755 of FIG. 7. For example, in one embodiment, the plunger type relief valve 855 utilizes a single spring 815 instead of two nested springs and an extra endplate (e.g., pressure relief spring 712, endcap 713, and spool valve spring 715).

In one embodiment, the plunger type pressure relief valve 855 of FIG. 8A provides an axial savings of approximately 0.1-3 mm as compared to the ball type pressure relieve valve 755 of FIG. 7. In one embodiment, there is axial savings due to the single spring 815 instead of nested springs with an endplate. In addition, the plunger 810 with its conical nose and spring tabs provides a reduction within a range comprising zero to a half or even more of the diameter of the ball 710. Thus, the plunger type pressure relief valve 855 will have an axial length that is approximately 0.1-3 mm shorter than a ball type pressure relief valve 755 used in a similar telescopic assembly. In another embodiment, the plunger type pressure relief valve 855 of FIG. 8A provides an axial savings of more than 3 mm as compared to the ball type pressure relieve valve 755 of FIG. 7.

In one embodiment, the axial savings is based upon the size of the components. For example, in a ball type pressure relief valve with a large ball 710 (e.g., a system, where the ball of the ball type pressure relief valve has a large diameter, e.g., 50 mm, 100 mm, etc.), the plunger 810 with its conical nose and spring tabs provides a reduction within a range comprising zero to a half or even more of the diameter of the ball 710. Thus, the plunger type pressure relief valve 855 will have an axial length that is somewhere in the range comprising 0 to 50 mm or more shorter than a ball type pressure relief valve 755 (having a 100 mm ball diameter) used in a similar telescopic assembly With reference now to FIG. 8B, a piston 800 with a pressure relieve valve 855 is shown in accordance with an embodiment. In one embodiment, piston 800 includes a body 822, pressure relieve valve 855, and a spool valve 820. In one embodiment, a piston rod 825 is used to open or close spool valve 820. In one embodiment, pressure relief valve 855 includes a cap 805 with an opening filled by a portion of plunger 810 which is held against cap 805 by the force of spring 815. For purposes of clarity, the components and/or functionality of FIG. 8B that are the same or similar to the components and/or functionality already described in FIG. 8A is not repeated, but instead the entirety of any components and/or functionality discussions provided herein is incorporated by reference.

In FIG. 8B, and in contrast to FIG. 8A, the spool valve 820 is in an open position such that flow path 854 is open. That is, flow path 854 is no longer blocked by spool valve 820 and fluid from chamber 653 and/or 693 can flow through flow path 854 and through port 856.

With reference now to FIG. 8C, a piston 800 with a pressure relieve valve 855 is shown during compression in accordance with an embodiment. In one embodiment, piston 800 includes a body 822, pressure relieve valve 855, and a spool valve 820. In one embodiment, a piston rod 825 is used to open or close spool valve 820. In one embodiment, pressure relief valve 855 includes a cap 805 having an opening filled by a portion of plunger 810 which is held against cap 805 by the force of spring 815. For purposes of clarity, the components and/or functionality of FIG. 8C that are the same or similar to the components and/or functionality already described in FIG. 8B is not repeated, but instead the entirety of any components and/or functionality discussions provided herein is incorporated by reference.

In FIG. 8C, the spool valve 820 is in an open position such that flow path 854 is open and the telescopic assembly 600 is being compressed (or lowered). During the compression of the telescopic assembly 600 fluid will flow from chamber 653 through flow path 854 through port 856 and into chamber 693.

With reference now to FIG. 8D, a piston 800 with a pressure relieve valve 855 is shown during extension in accordance with an embodiment. In one embodiment, piston 800 includes a body 822, pressure relieve valve 855, and a spool valve 820. In one embodiment, a piston rod 825 is used to open or close spool valve 820. In one embodiment, pressure relief valve 855 includes a cap 805 with an opening filled by a portion of plunger 810 which is held against cap 805 by the force of spring 815. For purposes of clarity, the components and/or functionality of FIG. 8D that are the same or similar to the components and/or functionality already described in FIG. 8B is not repeated, but instead the entirety of any components and/or functionality discussions provided herein is incorporated by reference.

In FIG. 8D, the spool valve 820 is in an open position such that flow path 854 is open and the telescopic assembly 600 is being extended (or raised). During the extension of the telescopic assembly 600 fluid will flow from chamber 693 through port 856 through flow path 854 and into chamber 653.

With reference now to FIG. 9, the opening of the pressure relieve valve is shown in accordance with an embodiment. In one embodiment, piston 800 includes a body 822, pressure relieve valve 855, and a spool valve 820. In one embodiment, a piston rod 825 is used to open or close spool valve 820. In one embodiment, pressure relief valve 855 includes a cap 805 including an opening filled by a portion of plunger 810 which is held against cap 805 by the force of spring 815. For purposes of clarity, the components and/or functionality of FIG. 9 that are the same or similar to the components and/or functionality already described in FIG. 9 is not repeated, but instead the entirety of any components and/or functionality discussions provided herein is incorporated by reference.

In one embodiment, the increase in fluid pressure within chamber 653 can cause problems such as hydrostatic lock of the telescopic assembly 600. As discussed herein, the pressure relief valve 855 is used to provide for the release (and relief) of the build-up of pressure within chamber 653 (beyond a predefined blow-off pressure).

In general, the buildup of pressure within chamber 653 is caused by events such as a significant force being continuously applied to the saddle, the bicycle going over a large unexpected bump, driving the rider further onto the saddle during impact with the ground, thermal expansion of the fluid, and the like. In general, thermal expansion occurs when the telescopic assembly 600 is moved from a cooler environment to a warmer environment.

For example, the telescopic assembly 600 (alone or while attached to the bicycle) is stored in an environment (e.g., a house, shed, garage, vehicle, etc.) at a first cooler temperature. Then, it is moved into a hotter environment, e.g., moved outside into a second hotter temperature. As the temperature of the fluid within chamber 653 changes from the first cooler temperature to the second hotter temperature, the fluid will expand.

If the telescopic assembly 600 is in less than a fully extended position, the thermal expansion of the fluid will likely cause the telescopic assembly 600 to extend thereby increasing the volume of chamber 653 until an equilibrium is reached or telescopic assembly 600 is at full extension. Once telescopic assembly 600 is fully extended (or if it started out in a fully extended position), the thermal expansion of the fluid within chamber 653 will no longer be able to increase the volume of chamber 653 and as such the pressure of the fluid within the chamber 653 will increase without relief. This will continue until the pressure of the fluid within chamber 653 reaches the blow-off pressure of relief valve 855.

Once the fluid pressure within chamber 653 reaches the blow-off pressure setting of the pressure relieve valve 855 (e.g., the pressure required to overcome the spring pressure of spring 815) the plunger 810 will be pushed into the chamber of body 822 thereby opening up the pressure relief flow path 930 which goes through the pressure relief valve opening in cap 805, flows between plunger 810 and spool valve 820, through flow path 925 in spool valve 820, out of body 822 through port 856 and into chamber 653.

In so doing, the over pressurized fluid within chamber 653 will be able to flow through the pressure relief flow path 930 and into chamber 693. In one embodiment, the IFP 25 in chamber 693 will adjust its location based on the additional fluid added to chamber 693 to "absorb" any deleterious effects of the additional blow-off fluid volume. In one embodiment, IFP 25 in chamber 693 will also adjust to any thermal expansion within chamber 693 to "absorb" any deleterious effects of the larger volume caused by the thermally expanded fluid.

Similarly, when the temperature change is in a cooler direction, such that the fluid thermally contracts, the IFP 25 will again "absorb" any deleterious effects of the additional blow-off fluid volume.

In one embodiment, just enough pressurized fluid flows through flow path 930 to lower the amount of pressure being experienced by the fluid remaining in chamber 653 to lower than the force applied on the opposite side of the plunger 810 from the spring 815 (the blow-off pressure), at which point the force being applied against the plunger 810 is not enough to overcome the spring constant and push the spring 815 downwards and plunger 810 will close the flow path 930.

Thus, by opening pressure relief valve 855 to allow for some pressurized fluid to flow through, the amount of fluid left in the chamber 653 is less than was there before, while the area remains the same, thus increasing the volume for the fluid that is left.

As noted herein, the pressure relief valve 855 is situated in series with the spool valve 820, such that the flow path 930 travels through both components before exiting the piston 800 and entering the chamber 693. Additionally, and significantly the two flow pathways, 854 and 930, have different points of entry into the piston 800, but the same destination point. This is significant since the spool valve 820 blocking the origination point of the flow path 854 is concurrently entering a hydrostatically locked position, while the pressure potentially causing the hydrostatically locked position is that which triggers the relief flow path 930 to open, thereby alleviating or eliminating any pre-hydrostatic lock symptoms. As such, the telescopic assembly 600 with the pressure relief valve 855, in accordance with embodiments, does not experience hydrostatic lock.

Thus, embodiments provided herein disclose a new and novel reduced axial length pressure balanced valve with integral plunger type pressure relief valve. Embodiments provided herein disclose a new and novel IFP. Embodiments provided herein further disclose a new and novel reduced axial length pressure balanced valve with integral plunger type pressure relief valve used in conjunction with the IFP.

In one embodiment, the telescopic assembly comprises the IFP as described herein and the pressure relief valve having a cap with an opening, a plunger configured to fill the opening in the cap, and a spring configured to hold the plunger against the cap.

In one embodiment, the IFP also includes a seal, the sealing channel configured to retain the seal, the seal configured to provide a fluid seal between the IFP and the chamber when the IFP is installed within the chamber.

In one embodiment, the anti-tipping feature includes a circumferential feature comprising a contact surface, the circumferential feature formed axially about the OD of the IFP and having a similar diameter as the sealing channel, the circumferential feature having at least one fluid pathway at least partially therein; and a stand-off fixedly coupling the circumferential feature with the one wall of the sealing channel, the stand-off providing a separation distance between the sealing channel and the circumferential feature, the stand-off having at least one fluid pathway at least partially therein.

In one embodiment, the separation distance of the stand-off is dependent upon the ID of the chamber. In one embodiment, the at least one fluid pathway of the stand-off includes an open area formed by reducing an OD of at least the portion of the stand-off to less than the OD of the circumferential feature. In one embodiment, the shape of the stand-off is an hourglass.

In one embodiment, one or more tangs are fixedly coupled with the circumferential feature, the one or more tangs about the OD of the sealing channel and projecting therefrom. In one embodiment, the length of the projection of the plurality of tangs is related to the ID of the chamber.

In one embodiment, the anti-tipping feature includes a plurality of tangs fixedly coupled with the one wall of the sealing channel, the plurality of tangs spread axially about the OD of the sealing channel and projecting therefrom. In one embodiment, the one or more of the plurality of tangs include at least one fluid pathway at least partially therein. In one embodiment, the one or more of the plurality of tangs have a scaffold type architecture.

In one embodiment, the sealing channel and the anti-tipping feature are formed from a single material. In one embodiment, the single material has a low coefficient of friction. In one embodiment, a material with a low coefficient of friction provided about the OD of the anti-tipping feature.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments can be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What is claimed is:

1. A dropper seatpost comprising:
a first post;
a second post, said first post telescopically engaging said second post;
a piston coupled to said second post, said piston comprising:
a first fluid pathway;
a fluid chamber enclosed within said telescopically engaged said first post and said second post, said piston separating said fluid chamber into a first portion and a second portion; and
a pressure relief valve disposed at least partially within said piston, said pressure relief valve comprising:
a cap with an opening therein;
a plunger configured to fill said opening in said cap; and
a spring configured to hold said plunger against said cap, said pressure relief valve providing a fluid pathway through said piston when a pressure of a fluid in said second portion of said fluid chamber is above a blow-off pressure of said pressure relief valve; and
wherein said cap of said pressure relief valve is threadedly coupled with a body of said piston to provide a threaded coupling between said cap of said pressure relief valve and said body of said piston.

2. The dropper seatpost of claim 1, further comprising:
a gas chamber enclosed within at least a portion of said second post or said first post; and
an internal floating piston disposed between said fluid chamber and said gas chamber such that said internal floating piston separates said fluid chamber from said gas chamber.

3. The dropper seatpost of claim 1, wherein said pressure relief valve comprises:
a first position in which said plunger has not sufficiently compressed said spring, and said fluid pathway is closed.

4. The dropper seatpost of claim 3, wherein said pressure relief valve comprises:
a second position in which said plunger has sufficiently compressed said spring, and said fluid pathway is open.

5. The dropper seatpost of claim 1, wherein said fluid pathway extends between said first portion of said fluid chamber and said second portion of said fluid chamber.

6. The dropper seatpost of claim 1, wherein said pressure relief valve and said piston are coupled such that a position of said pressure relief valve and a position of said piston remain fixed with respect to each other.

7. The dropper seatpost of claim 1, wherein a force provided by said spring to hold said plunger against said cap is adjustable by tightening or loosening said threaded coupling between said cap of said pressure relief valve and said body of said piston.

8. The dropper seatpost of claim 1, wherein a size of said opening in said cap is adjusted in conjunction with a surface area of a portion of said plunger, which is exposed to said fluid in said second portion of said fluid chamber when said plunger is seated against said opening of said cap, to establish said blow-off pressure of said pressure relief valve.

9. The dropper seatpost of claim 1, wherein a force provided by said spring to hold said plunger against said cap and/or a shape of a portion of said plunger, which is exposed to said fluid in said second portion of said fluid chamber when said plunger is seated against said opening of said cap, are selected to establish said blow-off pressure of said pressure relief valve.

10. The dropper seatpost of claim 1, wherein said plunger includes a conical nose portion.

11. The dropper seatpost of claim 1, wherein said plunger includes at least one tab, said at least one tab configured to engage with said spring.

12. The dropper seatpost of claim 1, wherein said pressure relief valve has a reduced axial length compared to a conventional ball type pressure relief valve.

13. The dropper seatpost of claim 1, wherein said fluid pathway through said pressure relief valve is a single flow path.

14. The dropper seatpost of claim 1, wherein said pressure relief valve prevents hydrostatic lock of said dropper seatpost.

\* \* \* \* \*